United States Patent [19]

Groves et al.

[11] Patent Number: 5,405,430
[45] Date of Patent: Apr. 11, 1995

[54] RECOVERY OF PRECIOUS METALS FROM EVAPORITE SEDIMENTS

[76] Inventors: William D. Groves, 502-901 Jervis St., Vancouver B.C., Canada, V6E-2B6; Lawrence Blackman, Box 195, Loomis, Wash. 98827

[21] Appl. No.: 226,299

[22] Filed: Apr. 12, 1994

[51] Int. Cl.$^6$ ............................................. C22B 11/04
[52] U.S. Cl. ......................................................... 75/744
[58] Field of Search .......................................... 75/744

[56] References Cited

U.S. PATENT DOCUMENTS

| | | | |
|---|---|---|---|
| 4,070,182 | 1/1978 | Genik-Sas-Berezowsky | 75/103 |
| 4,269,662 | 5/1981 | Kerley, Jr. | 75/103 |
| 4,369,061 | 1/1983 | Kerley, Jr. | 75/103 |
| 4,654,078 | 3/1987 | Perez | 75/103 |

OTHER PUBLICATIONS

Maslentitskii et al., Dissolution of Noble Metals at Elevated Temperatures and Pressures in the Presence of Various Complexing Agents, (translation) of pp. 221-227 of Chapter VII of Autoclave Processes In Non–Ferrous Metallurgy, (Moscow, 1969).
Berezowsky et al., Recovery of Gold and Silver from Oxidation Leach Residues by Ammoniacal Thiosulphate Leaching, Paper Presented 108th Annual Meeting of AIME, New Orleans, Feb, 18-22, 1979.
Zipperian Jr. et al., Thiosulfate Technology for Precious Metal Recovery, Summary of Paper Presented at 115 Annual Meeting of AIME, New Orleans, Mar. 1986.
Zipperian et al., Gold and Silver Extraction by Ammoniacal Thiosulfate Leaching from a Rhyolite Ore, 19 Hydrometallurgy 361-375 (1988).
Hemmati et al., Study of the Thiosulfate Leaching of gold from carbonaceous ore and the quantitative determination of thiosulfate in the leached solution, Paper Presented, 1989 Extraction Metalurgy Symposium, London, Jul. 10-13, 1989.
Changlin et al., Leaching Gold by Low Concentration Thiosulfate Soltion, Randol, pp. 293-298, Vancouver 1992.
Gundiler et al., Thiosulfate Leaching of Gold From Copper–Bearing Ores, Paper Presented at SME Annual Meeting, Reno, Feb. 15-18, 1993.
Dhawale, Thiosulfate, 70 Journ. Chem. Ed. 12-14 (1993).
Rose, The Mettallurgy of Gold 2nd ed. 1896 Chapter II pp. 30-31.
Gray et al. The geochemistry of Gold In Lateritic Terrains Ch. V.3 in Butt et al. eds. vol. 4 HandBook of Exp. GeoChem (1992).
Langhans Jr. et al., Copper–catalyzed thiosulfate leaching of low-grade gold ores, 29 Hydrometallurgy 191-203 (1992).

*Primary Examiner*—Peter D. Rosenberg
*Attorney, Agent, or Firm*—Burke-Robertson

[57] ABSTRACT

A process is disclosed for the recovery and assay of gold, silver (PMs) and the 6 platinum group elements (PGEs) from playa-evaporite sediments. Fine sediments are subjected to a primary leach with a highly caustic sodium thiosulfate leach liquor to produce a metal-pregnant solution. After filtration the pregnant solution is subjected to a two-stage precipitation of gold, silver and PGE values. In a first stage precious metals and some PGE elements are precipitated by lead acetate or sodium borohydride reagents. The precipitate may be subjected further to desulfurization and metallic footing to produce a lead-precious metal sponge. The sponge is de-leaded by firing and cupelling, selective cementation or electrolysis and reduction to dore is best effected by a carburizing distillation. The final recovery of the metal values is produced by controlled acid parting into individual precious metals and cupellation to the metallic state. In a second stage, the first stage precipitation liquor is scavenged by metal-exchange at reduced pH for additional metal values and cupellation to the metallic state. The second stage scavenger precipitate is an impure metallic powder and values are recovered by standard reduction and separation methods. Assay of the product (heads and precipitates) may be effected by high temperature methods developed for these types of deposits. Recovered flower sulfur and sulfite liquors are used to regenerate recycled thiosulfate. Mud leach tails are treated for agricultural use and land reclamation.

26 Claims, 6 Drawing Sheets

RECOVERY OF PRECIOUS METALS FROM EVAPORITE SEDIMENTS

This invention relates to the recovery and assay of gold, silver (PMs) and the platinum group elements (PGEs) from evaporite sediments.

BACKGROUND OF THE INVENTION

The geological concentration and trapping of metal values in sediments by desert evaporation processes results in a particular class of mineral deposits and the processes of recovery and assay of these sediments must be tailored to their geochemistry.

Some such sedimentary systems of commercial interest are those of certain of southeastern California playas. The deposits are of commercial interest primarily because of the presence of economic amounts of PMs and PGEs although a large suite of other unusual elements is also present.

The Amargosa River drainage system of Inyo County, Calif. is a good example. The region constitutes an intensely evaporative regime with challenging metallurgic features. In the past few million years, relatively high enrichment of PM-PGE values in this evaporative trap has been effected by the erosion of Basin and Range Age (Cenozoic) felsic ash volcanos, and the washing of green dioritic ash deposits of the same age directly into the playa, accompanied by the evaporation of late magmatic geothermal solutions.

The geochemistry of several of the dry playa lakebeds of the area also is characterized by zeolization of volcanic ashes in the alkali playas, the transport of PM-PGE ions by creosote and other plant oil ligands in upper groundwaters, and also by alkaline thiosulfate anions, in deoxygenated lower-level groundwaters. Evaporative stranding has resulted in the accumulation of Be, B and Li (as well as Na, K, Ca and Mg) as carbonates and jarosites. Jarosites are gypsum-like minerals believed to be derivative of the desert oxidation of original sulphides—commercially viable borax is available in the area. At deeper (deoxygenated) levels the sulfate is re-reduced bacterially to thiosulfate. Finally, re-oxidation of PM-PGE thiosulfate complexes to jarosites occurs near the evaporative surface.

The PM-PGEs are believed to be present as oxidized salts in which the PM-PGE are in valence states above zero. In these oxidized valence states, the PM-PGE end up as minor lattice substituents in microscopic insoluble jarosite-type minerals. The jarositic minerals are either wholly or partly absorbed in the microscopic zeolitic pores of the clinoptilolite type clay zeolites present in this type of playa bentonite.

One of the chief chemical trapping mechanisms is believed to be upward wicking of soluble PM-PGE thiosulfate complexes followed by their reprecipitation as insoluble jarosites as the thiosulfate ($S_2O_3^{=}$) ion re-oxidizes to the sulphate ($SO_4^{=}$) ion above the water table. Another such trapping mechanism is believed to be alkali saponification, in the lakebed, of PM-PGE-creosote-oil ligand complexes which results in the PM-PGEs being dropped as insoluble inorganic salts in the same zone. Certain salts, such as $Ag_2O$, are soluble and continue on down drainage.

Unlike the mineralogy of other ore bodies, such as primary sulfide deposits, the mineralogy of these sediments is such that significant amounts of radioactive, rare earth, heavy alkali and heavy metalloid elements are caught in the sedimentary trap as well as the PM-PGE values. Finally, "chromatographic-type" depletion of many of the light transition metals (largely insoluble in thiosulfates) and base metals occurs in transport enroute from source to lakebed. In addition, the base metals are captured as sulfides in deeper levels of the lakebed. All of these factors have contributed to the anomalous nature of the upper playa-level geochemistry.

Various characteristics of the geochemistry of these types of playa evaporite sediments ensure that the PM-PGE values have evaded recovery to this point, or even detection, by existing "standard" methods used by the mining industry. This evasion of recovery either has been complete or was prohibitive of commercially significant processing.

Cyanide chemistry fails because of the insolubility of the host jarosites, and because the destruction of the CN ion is catalysed by the presence of rhodium salts in the sediments.

Aqua regia chemistry also fails because of the insolubility of the host jarosites and because of absorption of the zeolites. In this medium the rhodium is also a catalyst for the destruction of the $NO_3$ ion.

Insolubility of the jarosites also precludes the use of mercury amalgamation as does the As, Sb and Te fouling of mercury. In addition, the extreme environmental toxicity of the mercury prohibits any commercial application of such technology.

Ammonium nitrate-sulfuric acid treatment was found to work rather poorly due to high acid consumption, as well as to the rhodium catalysis of the destruction of $NH_3$ and to the insolubility of the jarosite in acid solution.

Oxidative leaches of the insoluble, already oxidized mixture of PM-PGE salts, were found to be generally ineffective. Gravity methods failed due to the minute particle size, plus the lack of an appreciable density contrast (no discrete PM-PGE-only minerals) and the absence of the native metal state.

SUMMARY OF THE INVENTION

This invention is a process of recovery with a new leaching liquor, a new firing regime and new parting modifications that effectively addresses the problems encountered by commonly used existing technologies applied to evaporite deposits.

More particularly, the invention relates to a process for the recovery of PMs and PGEs from evaporite sediments in which fine sediments thereof are leached with hot, highly caustic sodium thiosulfate solution to produce a PM-PGE pregnant solution. That solution is then subjected to selective precipitation to produce a first stage precipitate, from which PM values may be recovered and a residual liquor, from which PGE values may be recovered.

In a preferred embodiment of the present invention, the process comprises the following steps:
(a) leaching fine sediments with hot, highly-caustic sodium thiosulfate solution to produce a PM-PGE pregnant solution;
(b) subjecting the metal-pregnant solution to selective precipitation to produce a (principally) PM precipitate, and a residual liquor containing PGE values;
(c) drying the PM precipitate and firing it with a copper-zinc high-carbon flux to produce a lead-copper PM metallic bullion;

(d) treating the PM metallic bullion sequentially with nitric acid, hydrochloric acid and iron metal to produce a copper-gold precipitate;

(e) treating the copper-gold precipitate with nitric acid to remove the copper and recovering the gold by filtration and standard firing.

In an alternative preferred embodiment, the process for recovery of PMs and PGEs from evaporite sediments comprises the steps of:

(a) leaching fine sediments with hot, highly-caustic sodium thiosulfate solution to produce a PM-PGE pregnant solution;

(b) subjecting the metal-pregnant solution to selective precipitation to produce a (principally) PM precipitate, and a residual liquor containing PGE values;

(c) desulfurizing the PM precipitate to produce native sulphur and a PM solution;

(d) treating the PM solution with zinc to produce a lead-PM sponge;

(e) de-leading the metal sponge and then subjecting it to high- temperature, high-carbon copper-zinc firing to yield PM dore;

(f) recovering the PMs from the dore by acid parting.

Another aspect of the present invention is the process, in the assay and recovery of PMs in the presence of relatively high amounts of PGE in mineral deposits, of firing at high temperatures with a flux containing elemental carbon.

BRIEF DESCRIPTION OF THE DRAWINGS

These and other objects and advantages of the invention will become apparent upon reading the following detailed description and upon referring to the drawings in which.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The Toxicity Of Arsenic

Arsenic values in the sediments are a problem to be addressed. We decided that the arsenic risks could be overcome if the arsenic values were chemically bound, as insoluble As +5 salts, prior to treatment with the highly caustic leach of this invention. Thus, preferably, as a preliminary step, in our process, dry slaked lime (about 1–3% by weight of $Ca(OH)_2$), is thoroughly mixed with the fine sediments. Acidification of the solution, in the second stage scavenger precipitation, tends to evolve highly toxic arsenic hydride gas ($ASH_3$). The prior addition of the slaked lime suppresses this tendency. If the pH of the leach is too low, below 10.5, the $Ca +2$ tends to precipitate at least $Ag +1$ and $Pd +1$. If, however, the pH of the leach is kept at 12–13, as is the case with this process, the slacked lime tends only to precipitate calcium arsenate. The addition of the slaked lime also precipitates calcium osmate which avoids the evolution of toxic $OsO_4$ gas.

The Interference Effects Of Rhodium

The catalytic effect of rhodium salts, present in the playa sediments, was a major barrier to the successful use of existing technology. An essential facet of the sodium thiosulfate leach is that thiosulfate is a sulfur, not nitrogen, reagent since rhodium destroys nitrogen reagents. Also, the high stability of rhodium ions in the thiosulfate complex is advantageous. This facet, coupled with the solubility of the sulphite and sulfate salts of rhodium, permit a multistage precipitation of values recovered by the leach. The selective precipitation divides the PM-PGE values into the two groups of: A:—essentially gold, with some silver, platinum and palladium, but, in any event, essentially rhodium free; and B:—essentially rhodium with palladium and iridium. Excluding rhodium from the first precipitate group makes the PM values easier to handle metallurgically (by allowing the use of nitrogen reagents), and contributes to the overall commercial viability of the process.

The essentially rhodium-free first stage precipitate, and the dore produced from it, then are susceptible to standard parting treatment with nitrogen containing reagents such as nitric acid, sodium cyanide and ammonia, which reagents otherwise would be destroyed by the rhodium.

Consequently, a strong caustic sodium thiosulfate leach liquor was found to be effective in freeing the PM-PGE values because:

(i) the highly-caustic sodium thiosulfate solution flushes, elutes or desorbs the metal ions from the zeolite;

(ii) the sodium sulfite ($Na_2SO_3$) acts as a solvent on the host jarosites in the way that gypsum is soluble in sodium thiosulfate solutions;

(iii) the reductive complexing action of the liquor captures the PM-PGE values at low valence states (typically, initially +1); and, (iv) the leach is free of nitrogen and thus is not subject to destructive nitrogen catalysis by rhodium.

There is an additional commercial advantage to using a caustic sodium thiosulfate medium for industrial leaching of sedimentary deposits of the southwestern region of the United States. The starting chemicals are available in the region at economically advantageous costs. An impure sodium carbonate (trona) and quicklime (CaO) are produced in southern California and suitable sulphur is available from the nearby Gulf states.

Another advantage for the leaching agent of this invention, is its ecological compatibility with the local environment. The leach constituents are non-toxic as such. Residual caustic concentrations convert playa clays into zeolite which is a useful soil conditioner and "titrates" excess alkali. The main final sulphur chemical is gypsum which is common to the local environment and which can have a beneficial effect on the local alkali desert soils.

Another aspect of the present invention relates to a process of assay and recovery of PMs in the presence of relatively high amounts of PGEs and mineral deposits.

The Problems Of Assay

The geochemistry of the sediments and the recovery of the PM-PGE values by the technology of this invention rendered existing assay methods ineffective, and new methods of parting and assaying had to be invented to overcome the difficulties. In particular, the presence of the PGEs with the gold and silver values provided several challenges. The new methods are also useful for the direct recovery of metal values at several stages of the general process of this invention.

The first innovation was the use of zinc metal as an additive to the standard high temperature copper collection assay. The use of zinc opened the solubility window of copper to iridium. Since gold generally tends to be captured by iridium, we considered this vital to getting an efficient gold recovery from the heads mud.

For this kind of assay the furnace must be one with good heat transfer that can be provided by luminous flame and it must be one capable of handling the high off-gasing in a safe manner. We developed a particular design of a direct fired diesel air furnace that provides the necessary high temperature (1500° C.) reducing atmosphere and high ventilation needed for success.

The copper collection with the addition of zinc, also collects tellurium, selenium and arsenic values, as well as all of the PM-PGE values, which requires that the copper-zinc bullion to be carefully parted with nitric acid.

A second problem related to the order of reactions in cupellation processes for PM-PGE values from these types of evaporite deposits.

In the "standard fire assay", used widely in industry for the assaying of gold, the convention is to use low-temperature (1050° C.) and low-temperature carbon, supplied by flour. This methodology seems to slag or volatilize the gold and PGE salts of fine playa sediments.

In the standard fire assay, approximately 2-3 grams of flour/assay ton of material in the flux chars to carbon at the relatively low temperature of 400°-500° F. and the litharge in the flux is chemically reduced —PbO to Pb°. The lead then melts in the charge, hot amalgamates the gold (Au°) particles and carries them down into the molten lead pool at the bottom of the crucible.

In the next step, the lead is cupelled off again as PbO, which soaks off into the porous cupel leaving behind a molten gold bead which does not wet the pot.

In this type of process the reduction of the PbO to Pb° precedes the collection. The method works for gold alone because gold, by itself, is soluble in native lead but not in the lead oxide. When high values of PGE are also present the scheme does not work.

When high levels of the PGE are present, as they can be in fine playa sediments, collection must occur at very high temperature so that there is a capture of the PGE by the PbO, and an entraining of the gold, before there is a reduction of the PbO (and the PbPGEOx dissolved in it) to the native alloy.

In our invention 15–20 grams crushed bituminous coal (or crushed briquettes)/assay ton of sediments are used instead of the flour as the carbon charge. This provides for late reduction at high temperature and allows the PbO collection to proceed at a first step. The late reduction is that of the whole charge, with the result that lead, containing PGE plumbides, with gold and silver drawn along by the strong AuPGE and Ag-PGE bonds, collects in the bottom of the crucible. To repeat, in this scheme, the collection preceeds reduction, and unless the reversal of the two steps is more or less complete, the collection will never occur by the standard fire assay no matter how many times it is attempted.

As a third complication for the direct "standard" fire assay of the evaporite sediments, the resulting lead bullion with the relatively high PGE content will not cupel satisfactorily. When a standard cupellation is attempted, the very strong PGE-Pb bonds (as plumbides) will not break. Instead, the lead oxidizes to form PGE plumbates, which tend to wet the pot. As a result, the PGE values soak off into the pot, as PGE plumbates, with the litharge. If the PGE-Au ratio is relatively high, the gold is also bonded to the PGEs, soaked off as well, and there will be no residual bead to be measured.

This hazard is addressed by using a low flux-high temperature carburizing distillation technique in the induction furnace to eliminate the lead. Under a light borax cover, high carbon addition to the bullion carburizes the PGE, so that the PGE-C bond breaks and replaces the PGE-Pb bond with a PGE-C bond, releasing Pb° which is, then, distilled off through the loose fitting lid on the crucible. A scoriation dish can be used as the lid to facilitate this.

Thus, the lead leaves the system before it is oxidized. A continuation of the high temperature treatment permits the very slow intake of air. This slow intake of oxygen, then, oxidizes the carbon out of the charge leaving metallic dore. This carburizing distillation, as such, is not necessary when firing is performed on sponges or precipitates where the bulk of the PGE has been separated and essentially gold is the main precious metal value in the sponge or precipitate.

In another innovative modification, 15–20 grams/assay ton of dry sodium cyanide (NaCN) prills is added to the flux mixture of precipitates or sponges from the leach process prior to firing them. The addition of the cyanide avoids the extreme volatility losses in the early stages of firing as volatile chlorides, hydrides, semihydrides, carbonyls, hydroxides, peroxides, oxides and arsines. Metal cyanides form on the surfaces of the finely divided nobel metals and, by displacing the other ligands, help to insulate the metal values from volatilization.

The CN group also attacks bonds, such as antimonide and arsenide, converting them to easily oxidizable thio(analog)cyanates which then slag or volatilize. After the other ligands have either slagged or distilled off, the cyanide ligands break leaving the metals in metallic state to be collected by the collector base metals.

Calcium carbide also works but the carbide bond is not as effective as is the CN bond. The high energy carbide bond also can displace other ligands and forms strong PGE-carbide bonds which eventually char at the high temperatures to leave PGEs in native state.

The cyanide or carbide treatment can increase the recovery of the PM and PGE values from the precipitates manyfold, and is an important recovery factor.

The final problems we had to examine were the inaccuracies and difficulties of spectrographic detection and analysis engendered by the presence of the high PGE values.

Also, silver tends to mask the spectrographic signature of the PGEs by acting as a wavelength shifter. Silver atoms absorb the emission frequencies of the PGEs and re-emit at silver-frequency frequencies along with the low energy 'split' frequencies outside the measurement range. In the result, much in the fashion of a ruby laser that provides a red signal regardless of the input wavelength "pumping" it, the final emission frequencies are pumped out as "silver" signals. Peak-shifting of the silver also occurs due to the strength of the silver-PGE bonds. The result is severe spectrographic masking of PGEs by silver, particularly in x-ray spectra.

Particularly on digital-read-out spectrographs even a slight peak shift can make the identification 'miss'. Low-temperature optical spectrographs (such as AA) are more severely affected than are the higher temperature ones such as with DCP and ICP machines.

Finally, very subtle problems can arise in the spectrographic analysis of the PGE from evaporite sediments. We believe there are slight, but finite differences in the chemical reactivity of the numerous isotopes of heavy metals like the PGEs. These differences are of little consequence in ordinary reaction or catalyst chemistry. Yet, in the very slow, and, hence, potentially selective, processes in the chemical weathering cycle in the erosion of primary deposits, there is a significant differentiation effect. The isotope signature of the residual 'placer' is, therefore, that of the most chemically resistant isotopes. In the case of evaporite sediments, the isotope signature is that of the secondary salts that have been accumulated—the more soluble isotopes. There are, therefore, significant differences between placer and evaporite metal isotope ratios. Since spectrographic PGE standards are made mainly from Russian placer metal, there may be potentially significant recognition problems in the spectrographic analysis of dore derived from evaporite sediments.

To compound the problems of spectrographic type analysis and assays, the very techniques of the standard fire assay inherently designed to lose what PGE values are present: the PGEs are lost in the slag with the PbO left unreduced, and in the cupel, where the PGE values follow the re-oxidized PbO into the cupel.

The practice of "brightening" the gold by the addition of calcium florite ($CaF_2$) to the assay flux to dispel heavy PGE up the stack as volatile hexaflorides adds to the problems. Indeed, the standard practices are designed to eliminate, literally, the problems of PGE detection, one way or another (by eliminating the PGEs). Thus, reliance on existing "standard" assaying methods may result in a total failure to detect many commercially significant deposits of PM-PGEs.

To counter the spectrographic limitations, we reverted to parting the dore into constituents that are pure enough to be identified without having to rely upon spectrographic analysis. As we have indicated, the main step was to pre-part the leach precipitate to segregate the values into two groups: the one free of rhodium and the other high in rhodium. The rhodium-free precipitate then would be susceptible to parting with nitric acid, sodium cyanide or ammonia.

Yet, even with nitric acid parting of the first precipitate dore, care is necessary. If an alloy is just one of gold and silver, the nitric acid parting, adjusted, if necessary, by silver inquartation, results in the silver being dissolved and the gold remaining in the solid phase.

When appreciable amounts of platinum and palladium are also present, as the silver builds up in the parting acid, there is a synergistic promotion of oxidation potential of the silver with the PGE. This results in the production of the Ag +3 ion which can push all the gold and the PGEs into solution.

The remedy we have invented is to remove a first parting solution with most of the silver and palladium in it. A small amount of fresh, fairly strong nitric acid (1/6 $HNO_3/H_2O$) is added and allowed to saturate with metal. Eventually, the platinum, as it enters the solution, forces any dissolved gold back into the solid phase by metal exchange. No trace of chloride can be present for this to occur. The solid residue is, then, essentially gold.

The two parting solutions, then, can be combined and boiled carefully down to dryness. On continued gentle heating, the PGE nitrates decompose to the metallic state at about 350° C. and the more thermally stable silver nitrate ($AgNO_3$) forms a melt. This silver nitrate, on cooling, can be leached with water, leaving the PGEs behind in metallic form.

The gold from this parting is pure enough to read 85–96% pure on the SEM/XRF microprobe. The PGEs can be weighed free from gold and silver.

Also effective for the separation of platinum-plus-palladium from gold-plus-silver is the standard selenic acid parting. If the dore is foiled very thinly, and boiled in 10% $H_2SeO_4$, a pure residual platinum solid is produced. From the solution, the gold drops out about a day or so later as a yellow to brown precipitate while the silver and palladium remain in solution. The gold is relatively pure and the platinum product is silver-free.

The process of this invention has been carried out at the laboratory and bench-top scales. Embodiments of the invention are next described with reference to the drawings provided herewith.

A more detailed description of the invention in conjunction with the accompany drawings will now be provided.

Figure 1:
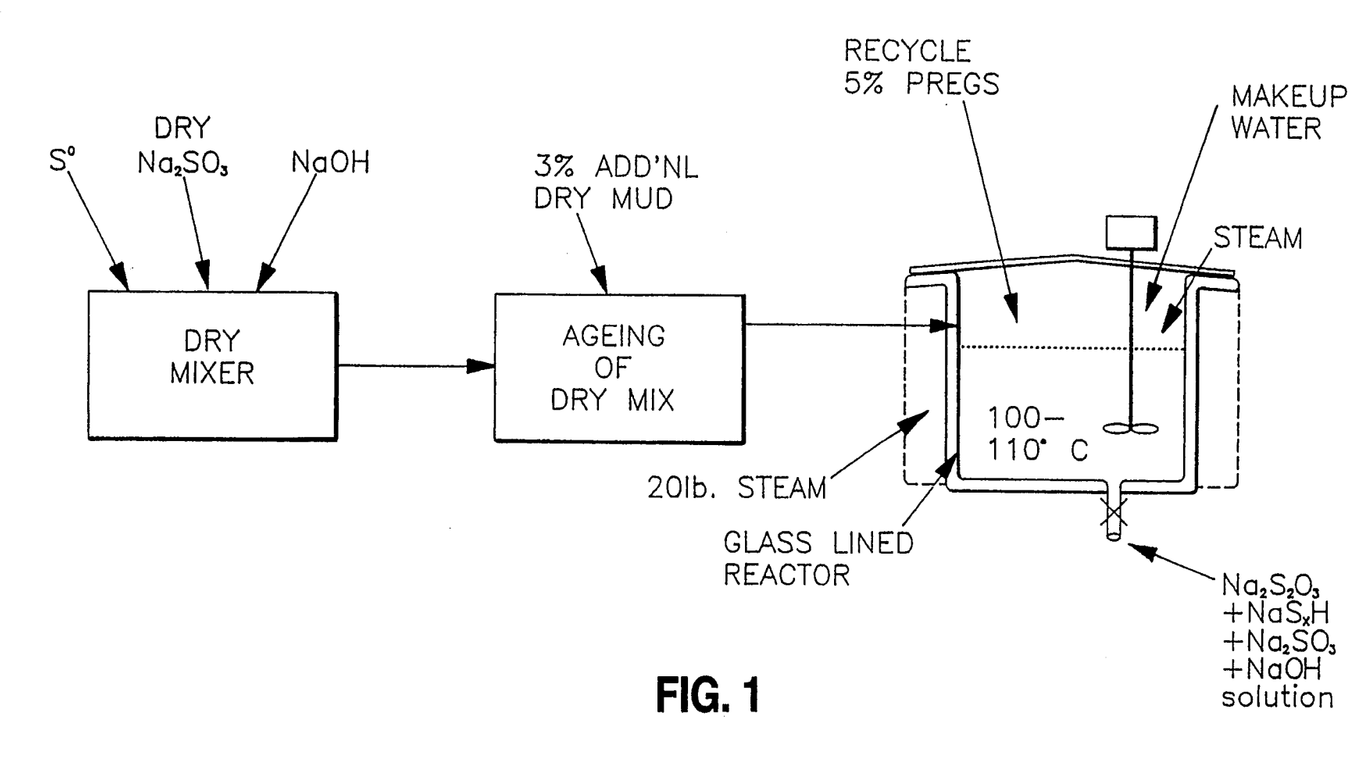
FIG. 1 is a flow diagram of the synthesis of primary reagent used in the recovery process of the present invention.

PRIMARY REAGENT SYNTHESIS (FIG. 1)

In this part of the invention, the thiosulfate and caustic are produced from the combination of sulfur with sodium hydroxide.

The physical form of the starting reagents is very important to the success of the reagent synthesis.

In particular, the sulphur must be very fine yellow flower (spray sulfur). A commercially available acceptable form is the surfactant-treated Wilbur-Ellis brand used to spray fruit trees. The allotropic form of the sulfur, its state of division and the surface wetability are important variables. The sulfur should be extremely fine and the wetability controlled by surfactant treatment.

The best form of caustic is flake or fine prill and the sodium sulfite can be of the technical grade (such as that manufactured by Rhone-Poulenc) with about 40 mesh or finer.

Referring to the Primary Reagent Synthesis in FIG. 1, the sulfur, sodium sulfite and sodium hydroxide are dry mixed in a ratio of 1:4:4–5 parts by weight. About 1–3%, by weight, of dry lakebed mud will catalyse the reactions.

During the dry aging, the caustic rapidly absorbs atmospheric moisture and the fine sulfur, which coats or "flours" the caustic, begins to react with the caustic. Surface reaction is of the following type:

(unbalanced)

The sodium polysulfide ($NaS_xH$) breaks open more of the $S_8$ chains and the reaction continues to convert more sulfur and caustic. The water of reaction also helps to accelerate the reaction.

It is noteworthy that, in this reaction, the sodium thiosulfate is made directly from sulphur and caustic: no sodium sulfite is involved. The $S_8$ chains are believed to disproportionate: two adjacent sulfur atoms oxidize to an average valence state of +2 (i.e. S-2 and S+6: average S4/2 = +2) and two adjacent sulfur atoms go to S-2 sulfide units at the polysulfide chain-ends. The S+6 'robs' 3 oxygens from the hydroxide groups of the sodium hydroxide: $4OH \to 3O\text{ -}2$, plus $H_2O$, plus $2H+$ are contributed to the end of the polysulfide group.

Control of the aging process is an important variable and it was found that the color of the caustic prills is an effective indicator of the progress of the aging. When the aging has proceeded for 15-20 minutes the caustic turns to a range of colors—yellow to orange—and that is when the aged mix should be added to the wet-stage reactor.

In the wet reaction stage, in FIG. 1, the principal reaction is the disproportionate of the sulfur as described above, involving only elemental sulfur and sodium sulfite.

In the second stage, the addition of 1-5% (by volume) of the PM-PGE pregnant solution from a previous leach increases the rate of synthesis of thiosulfate. The rate and progress of the reaction can be tracked by the disappearance of the solid sulfur. The PGE in solution are a redox catalytic agent. One reaction rate believed to be enhanced is the conversion rate of the polysulfide terminal group sulfur (S=) and sulfate ($SO_4$=) to thiosulfate.

Once again reaction conditions are important. The optimal temperature is about 105° C. Dissolution of the solid NaOH is exothermic and also causes a boiling point rise of the solution due to the dissolved caustic content. A heat flux into the reaction vessel, in FIG. 1, can be maintained by such means as an elevated pressure steam jacket or glycol-water boiling jacket to supply heat for the endothermic formation reaction of the thiosulfate. To get the boiling-point rise effect, only enough water should be added to the reaction vessel to make a solution of 10-20% solids (by weight). The strength of the solution, then, can be adjusted for the primary leach phase.

The freshly made pregs, that are added as catalyst, ideally, should be clear to pale straw in color. Too dark a color of the pregs is an indication of excessive side reaction to the red sodium polysulfide Any "black" especially Pt° black, instantly breaks the leach.

The leach solution of sodium thiosulfate, sodium hydroxide, sodium sulfite and sodium polysulfide is then extracted from the reaction vessel, in FIG. 1, for use in the leach stage.

Figure 2:
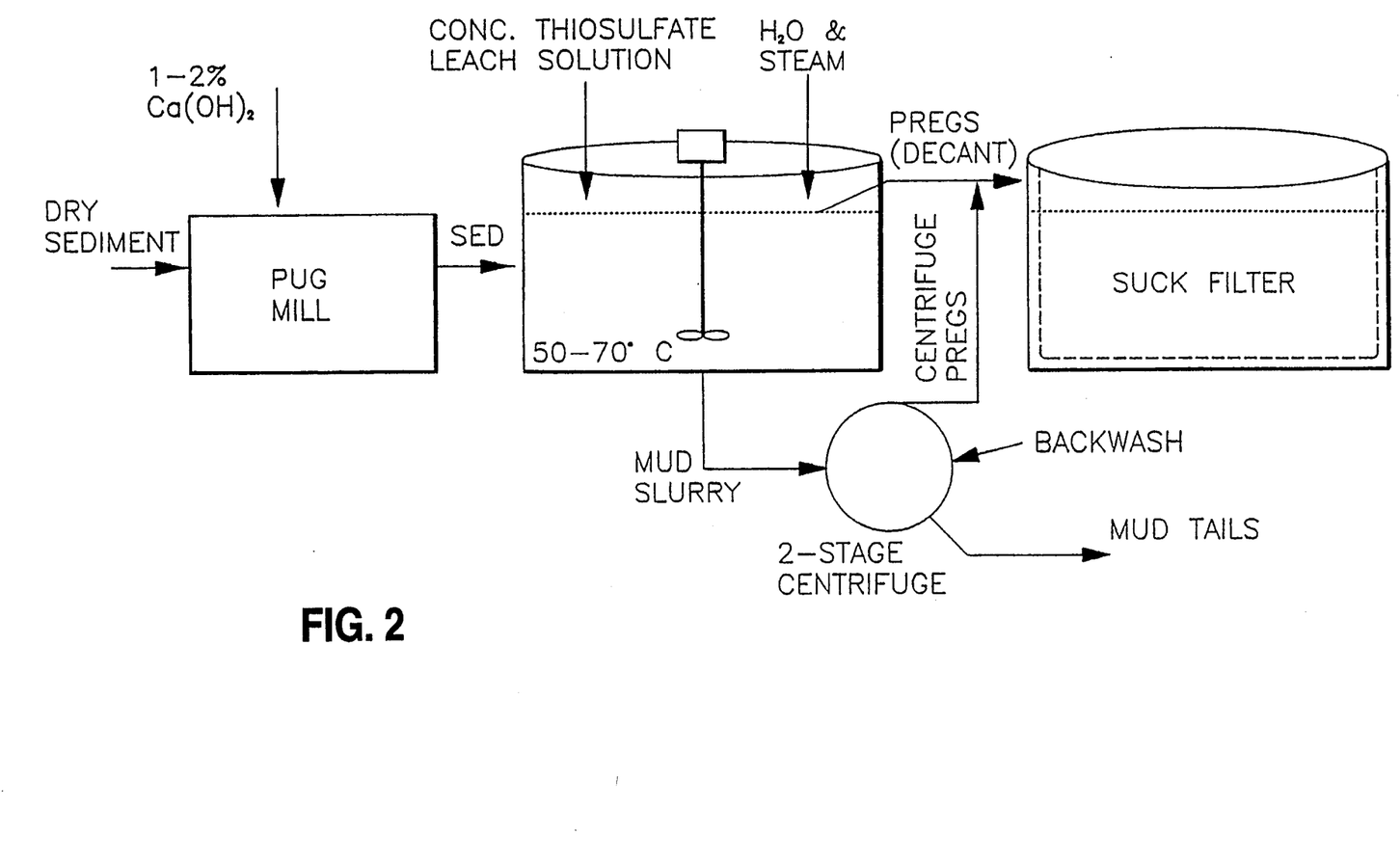
FIG. 2 is a flow diagram for a preferred embodiment of this invention in which the reagent prepared in the process shown in FIG. 1 is used to produce a solution of PM-PGE values in a pregnant liquor.

PRIMARY LEACH PROCESS (FIG. 2)

In a preferred embodiment of this invention, evaporite sediments are pug-milled with a 1-2% slaked lime ($Ca(OH)_2$) until thoroughly mixed. As indicated above the purpose of the slaked lime is to suppress toxic gaseous arsenic and osmium compounds that otherwise would be produced at later stages of the process.

As an alternative, the feed mud can be slurried to allow wet-screening of the small percentage of oversize particles in the sediments, by using enough water to get the desired leach reagent concentration.

The dry sediments are mixed with the concentrated thiosulfate solution in a reactor. Steam is used to keep the temperature between 50°-70° C. and the leach is carried out with gentle stirring.

If the temperature is much hotter than the 70° C. threshold, some thiosulfate auto oxidation-reduction occurs most likely in the following format:

in which, TS=thiosulfate. The reaction depicts the thermal decomposition of gold thiosulfate to native (colloidal) gold and sodium tetrathionate in which reaction there is a 2-electron oxidation per molecule of tetrathionate formed.

Sodium tetrathionate dimer is inert as a PM leachant. When crystalline sodium thiosulfate sits on the shelf, it dimerizes into sodium tetrathionate and it ceases to be capable of complexing precious metal ions. This is one of the reasons why the thiosulfate solution works best when it is prepared fresh. Such reactions as the thermal decomposition of gold thiosulfate complex help to re-precipitate colloidal gold back onto the leach solids. Silver, palladium and platinum also undergo such thermal decomposition reactions.

There are other possible hot decomposition reactions. With the presence of Fe +2 Mn +2, Ca +2 Pb +2, Cu +2, there is a genus of reactions typified by:

in which there is a severance of the sulfur bonds into separate S −2 and $SO_4$ species. Lead or PMs react with sulfide, precipitating these, and the calcium, iron, manganese (and lead) cations pair with the sulfate.

These kinds of reactions are avoided by keeping the pH above 10.5 and the leach temperature somewhat below 100° C.

Because of the finely divided state of the sediments and the strength of the leach solution, the leaching time is relatively short—ranging from a matter of seconds to about twenty minutes as a function of temperature—to reach completion. During this reaction time the metals are complexed initially in colorless (lowest valence state) thiosulfate complexes which then oxidize (by what appear to be intricate redox reactions involving sulfur species and the PM-PGE species) to a light to dark honey colored solution. The solution is colored by red polysulfide, and brown Rh, Pd and Pt cations in the higher valence states (+4 cations). The higher valence state (colored) PGE ions require more thiosulfate ligands to complex them. Some of the darkening is due to the oxidative reactions of thiosulfate to the tetrathionate.

If the leach solution is too dark indicating formation of polysulfides, a green precipitate (possibly a compound of either nickel or vanadium) begins to form in the pulp. This precipitate does not seem to rob the PM-PGE values.

If the leach time is too long, in excess of 30 minutes, there can be excessive consumption of the caustic. In this case swelling of the clays may result, making the filtration extremely difficult. If the caustic strength falls below the level necessary to keep the pH above 10.5, the decomposition reactions to PM sulfides and base-metal sulfates begin to rob the pregs.

In the primary leaching stage, the clays gradually start to dissolve in the leach solution and then, on an extended time track, reprecipitate as zeolites consuming caustic until the pH drops to 10.5. The zeolites, then, re-absorb the PM-PGE values. A general scheme for this process is believed to be as follows:

$$NaOH + SiO_2 \rightarrow Na_2SiO_3 \text{ (sodium silicate)}$$

$$NaOH + Al_2O_3 \rightarrow Na_2AlO_3 \text{ (sodium aluminate)}$$

sodium silicates +1 sodium aluminate→1 molecule of zeolite precipitates.

The zeolite is a white microgranular inert precipitate. The magnesium and calcium silicates seem to be less affected.

At this point the timing of the leach and the filtration are important variables. In the above equations the reaction time to the silicates is fast, while the conversion to zeolite takes several hours to complete.

After some 20 minutes, the leach stirring is stopped and the mud is allowed to settle. In the preferred embodiment of this invention, the clear supernatant pregs are filtered through a polishing filter. The concentrated mud bottoms can be centrifuged or filtered and backwashed, and the pregnant liquor also can be run through the polishing filter. The total pregnant liquor is then available to the first stage precipitation.

The cloth of the polishing filter can be cotton canvas and the dilution of the pregs by the wash water in the centrifuge is desirable to aid later precipitation.

The tails mud eventually acquires a microgranular texture with a zeolite enhancement to help in soil texture.

Figure 3:
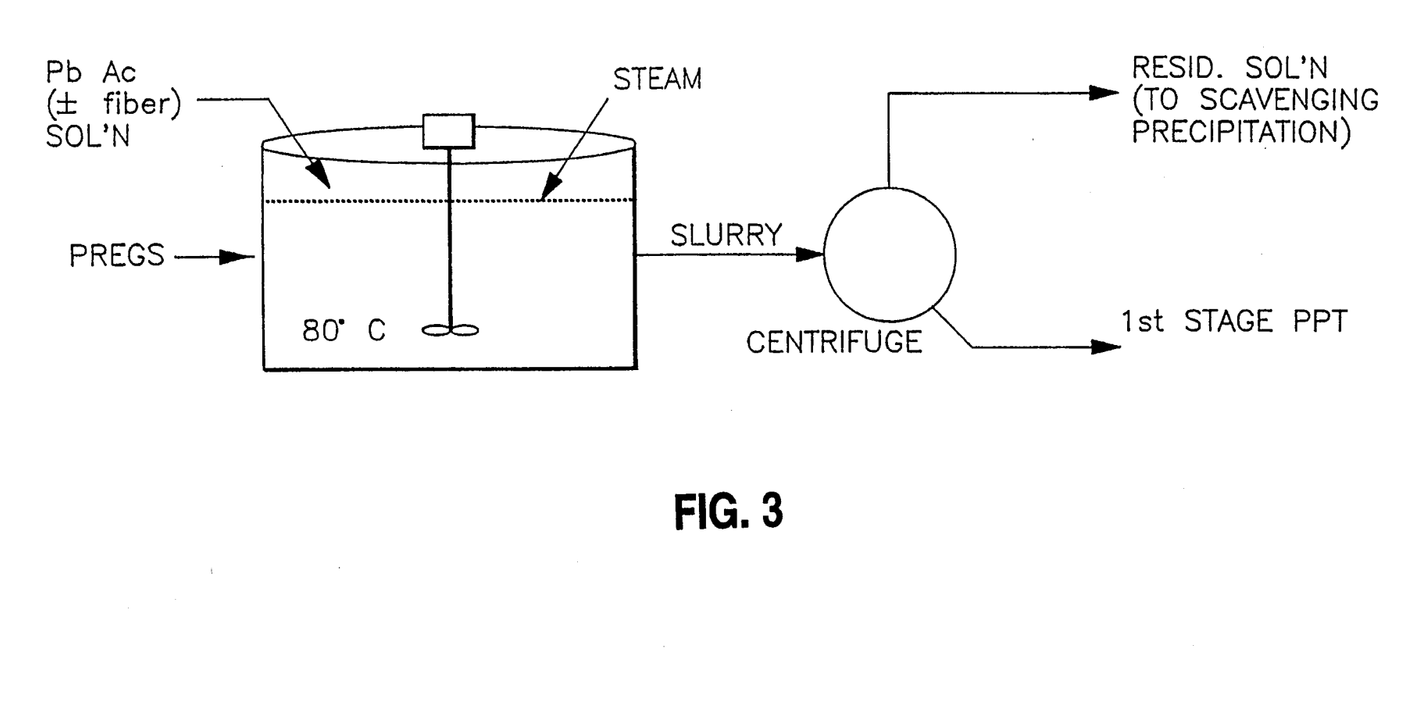
FIG. 3 is a flow diagram of the separation of the PMs in which, the pregnant solution is treated with lead acetate to produce a first stage rhodium free precipitate and a residual liquor available for scavenging of additional PGE values.

FIRST STAGE PRECIPITATION (FIG. 3)

In this process, the pregnant PM-PGE solution from the primary highly caustic leach is treated with well-known precipitating reagents such as lead acetate (with or without cellulose fibre) or sodium borohydride to produce a first stage precipitate and a residual liquor. The first stage precipitate is essentially gold and silver with platinum and palladium and is essentially free of rhodium. The residual liquor carries the soluble rhodium and other PGE values.

The pregnant solution of PM-PGE values from the leach is adjusted to the temperature range of 50°–80° C. by steam injection.

Lead, estimated at 2–3 times by weight, of the PM-PGE to be precipitated, is added to the pregs. The lead is in the form of strong lead acetate solution and the estimation is made on the basis of preliminary experiment. The lead acetate is synthesized from litharge (PbO) and glacial acetic acid (HAc), with about ⅛ the volume of water to acid added. The reaction is kept at about 60° C. and some extra HAc is added to promote solubility. Paper pulp can be added with the lead acetate to promote gold precipitation and filtration.

A black precipitate forms almost immediately. Although the precipitate settles rapidly, the mixture can be stirred intermittently to increase particle size to aid the subsequent filtration.

The temperature range is flexible but has critical limits which have to be fine-tuned empirically. At the lower temperature of 50° C. double insoluble Pb-PM thiosulfates are present in the precipitate. At higher temperatures, in the 80° C. range, most of the precipitate is native gold and platinum and sulfide (e.g. $Ag_2S$ and PbS). Colloidal gold which is decomposed at the higher temperatures, tends to be collected by the fibre, most likely because of reactions with the beta cellulose of the fibre surfaces.

If the precipitation is effected at say 100° C., rhodium precipitates as Rh as a result of a redox reaction with the acetate ion. Since rhodium is undesirable in this first stage, the precipitation temperature is kept below this threshold.

Ideally, the precipitate should be allowed to age for 1–4 hours and then it is decanted/filtered or centrifuged through a cellulose-base (paper or canvas) filter.

Dilution of the pregs by a factor of twice the leach strength is helpful in the precipitation. The residual liquor from the filtration can be sent for scavenging.

Figure 4:
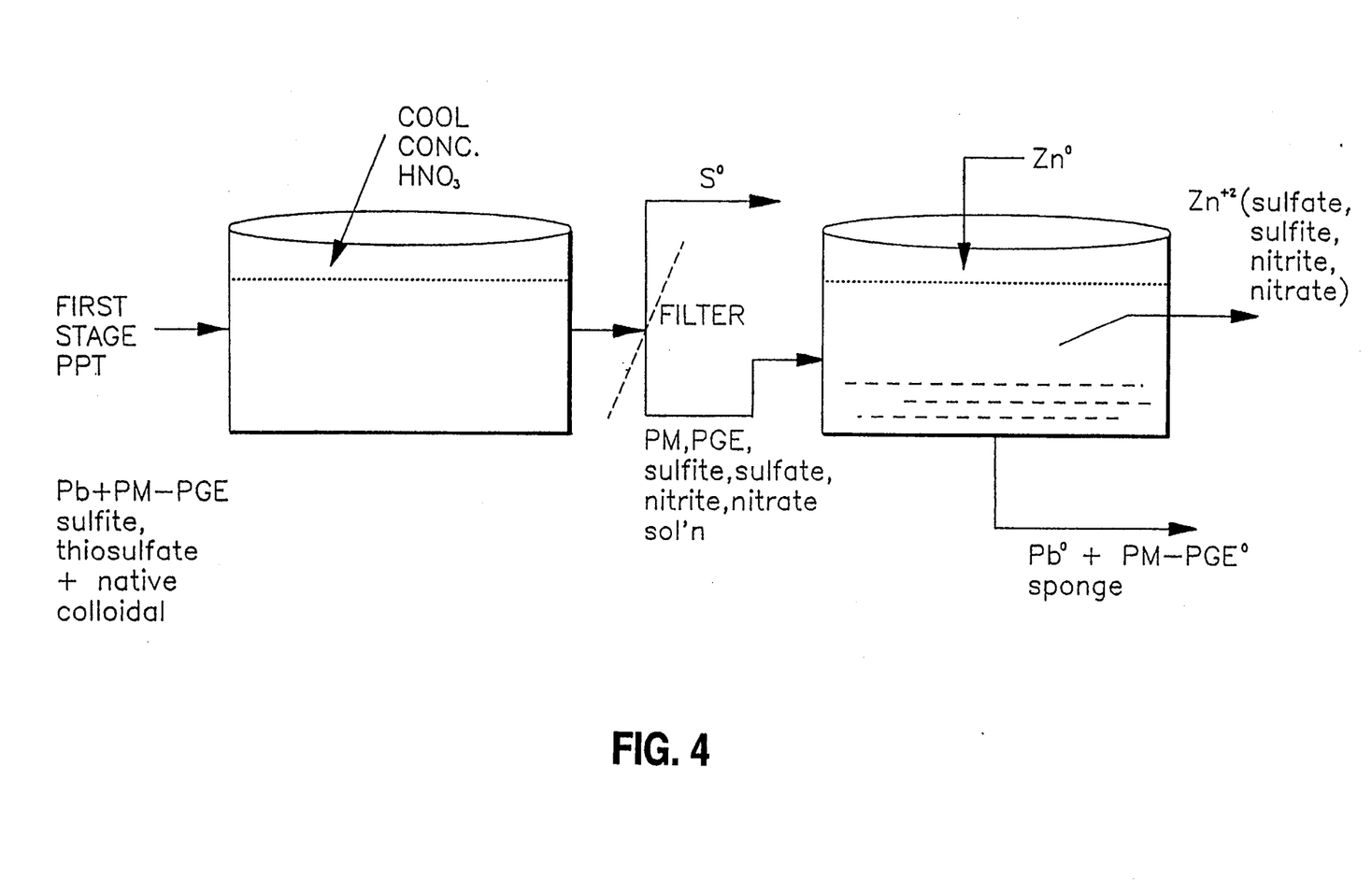
FIG. 4 is a flow diagram of the treatment of the precipitate from the first stage in which the PM-PGE containing precipitate is treated with cool nitric acid to produce native sulfur for recycle and a PM-PGE solution. The solution is then footed with zinc to produce a lead PM-PGE sponge and a sulfite solution which is recycled.

FIRST STAGE PRECIPITATE TREATMENT (FIG. 4)

Alternative A

The metal values may be recovered from the first stage precipitate by the high-carbon high-temperature firing embodiment of this invention.

The flux used for this firing, in accordance with the art of this invention, has zinc added with the copper in a weight ratio of 0.5–1:1 and the carbon is usually added in the form of charcoal dust. It should be noted that when firing the lead acetate precipitate, there is lead already present in the precipitate as well. The firing is at a final temperature of 1500° C. in a direct fired diesel furnace. The firing time is 30–40 minutes.

The metallic bullion-button usually forms in two phases: a lead-rich phase with PGEs and a copper-zinc rich phase with gold and silver.

The metallic bullion-button can be comminuted by drilling or lathing and, then, the metal shavings or turnings treated with dilute $HNO_3$ (about ⅛ with water) at a volume of 40–60 mls per gram of metallic button. After a maximum settling time of 1.5 hours, only the native iridium is left as a solid residue and can be removed.

The blue-green copper parting solution can be allowed to stand, for as long as 12–15 hours and, then, treated with concentrated hydrochloric acid and footed with enough iron (steel wool) at 25° C. to foot all or part of the PMs. The amount of hydrochloric acid is 2–3 mls per gram of button being parted. The object is to ration the amount of Fe° to foot the gold preferentially, and later, to part most of the PGEs on addition of more iron or lead, after the gold-rich residue is removed.

The addition of the iron produces a floating gold precipitate and a cement that settles very rapidly. This coppery colored metallic precipitate-cement is removed, then treated with more dilute nitric acid (about ⅛ $HNO_3:H_2O$) which dissolves the copper and leaves the PM (essentially gold) as tiny scales together with a brown powder. The metal values can then be filtered, dried and cupelled at 950°–1050° C. to produce a gold button of 85–98% purity.

Alternative B (FIG. 4)

The process of Alternative A does not allow for the recovery and recycle of raw material. Consequently, the following alternative process likely is of more commercial interest.

Figure 5:
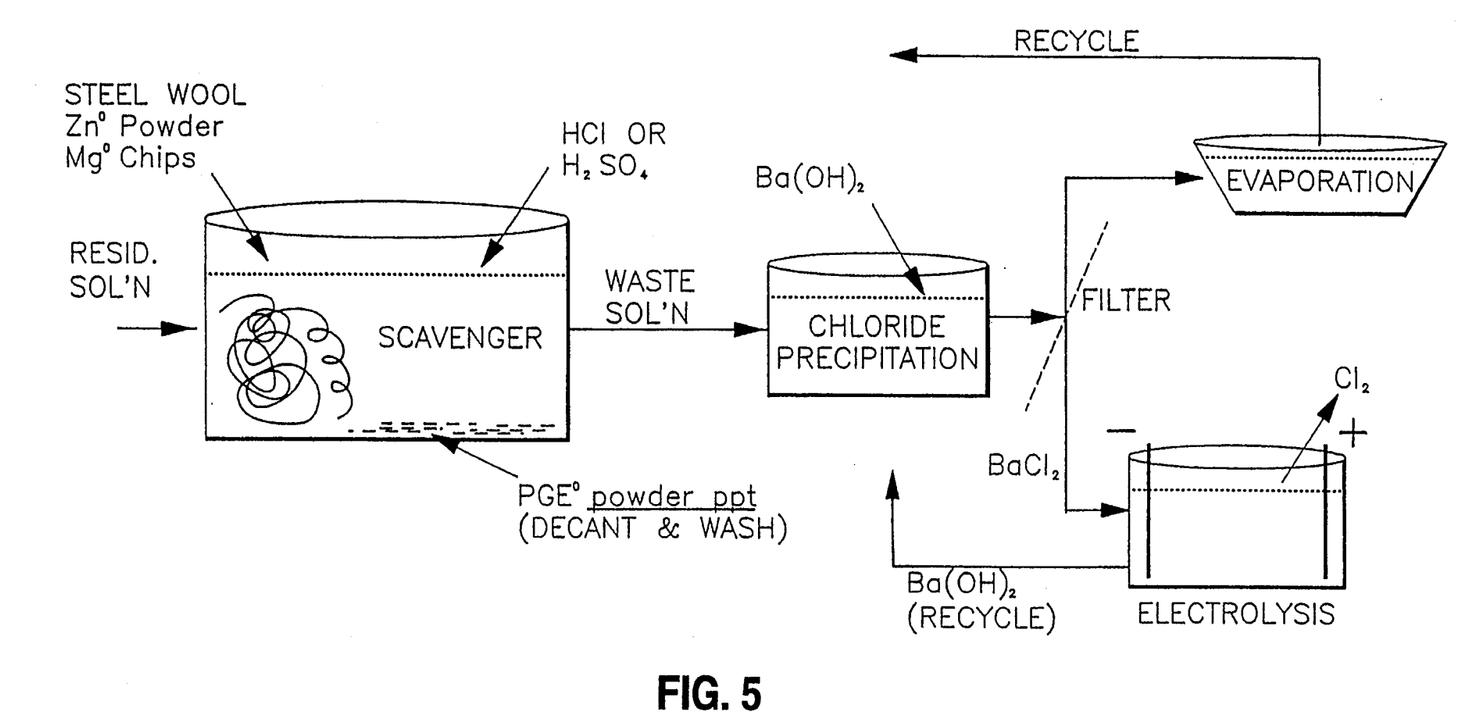
FIG. 5 is a flowchart for the scavenger precipitation of the residual solution from the first stage precipitation in which the acidified solution is treated with iron, zinc and magnesium to obtain a PGE powder and a waste solution which can be treated for recycling.

After being washed with water in the filter or centrifuge, the first stage precipitate is treated with cool, strong nitric acid (50% $HNO_3$). This sulfur from the sulfides separates immediately as S°. The sulfur is pale yellow and very fine. The sulfur can be filtered and recycled to make fresh leach solution—see Recycle Thiosulfate Resynthesis (FIG. 5).

The clear, colorless solution contains lead, PM and PGE ions plus sulfate, sulfite, nitrate and nitrite ions. The anions derive both from the reagent and from the oxidation of thiosulfate ion content of the precipitate.

The solution is treated with metallic zinc in the form of either dust or granules. With the addition of the zinc, a dark grey to black metallic sponge forms quickly. The sponge ceases to grow in 5–20 minutes, at which point, the supernatant solution, which contains $Zn +2$ ions, together with sulfates, sulfites, nitrate and nitrite ions, is decanted.

Lead sulfate is rather insoluble, particularly when at cool temperatures. However, in this process the nitrate and the nitrite ions apparently complex the lead ion and help prevent the precipitation of lead sulfate on the sponge. The sponge is a molecular mixture of metallic lead and PM-PGE values. The lead acts as a sweep, as in a Chiddy assay, and carries down the noble metals. It is important that all of the PM-PGE values are down before all of the lead is down which provides a useful means of process control. High-temperature PbAc precipitation results in more sulfide and less thiosulfate in the precipitate and, hence, there is less sulfate at this stage.

The sponge is filtered and washed with water. The sponge is washed to eliminate anion-containing barren solution and it is then ready for subsequent treatment for the recovery of the metal values.

The treatment can consist either of smelting to lead bullion or alternatively, first, partially de-leading by nitric acid re-solution. In the latter de-leading process, hydrochloric acid precipitation drops insoluble metal chlorides with ammonium hydroxide re-extraction to separate the $NH_3$-insoluble lead from the $NH_3$-soluble PM-PGEs.

The gold tends to stay in the aqua regia (HCl after the $HNO_3$) and, in the lead residue. Gold is unstable in the $NH_3$ complex and reprecipitates as a light brown gold hydroxide which can be explosive if dried.

The lead content of the bullion can also be separated by the standard Betts process. The bullion is cast into anodes and electrolysed in a fluorosilicate electrolyte in which lead is soluble. The lead crosses to form a lead cathode. The PM-PGEs fall to the bottom of the cell together with heavy metalloids. Thus the PM-PGEs are recovered as an anode slime with the heavy metalloids, while the light transition metals are left behind in the electrolyte.

In the formation of the lead sponge, the timing of the zincing period and the removal of the barren solution are crucial. The barren solution must be removed to avoid sulfate precipitation with the sponge or oxidation of the sponge after the zinc is gone. The footing process is maintained at a pH 2–5 with enough acid present to allow complexing nitrite and nitrate anions to prevent $Pb +2$ ions from precipitating as lead sulfate ($PbSO_4$). If the pH is allowed to drift to 7 or more, the lead and zinc salts will precipitate in the sponge. The balance is maintained by carefully matching nitric acid addition to the zinc reduction action. If the sponge is left in the solution after the zinc is used up, the sponge rapidly redissolves in the acid and then reprecipitates as salts (including zinc salts) after the acid has been exhausted.

The sponge is then washed and is ready for firing and parting.

SCAVENGER PRECIPITATION (FIG. 5)

The residual thiosulfate pregs solution after the first stage precipitation will contain the rhodium and palladium ions.

These values are recovered either by acidification with hydrochloric acid and metal exchange with magnesium or iron which foots the rhodium and palladium in elemental form or, alternatively, as oxides, over a period of days. The iron can be supplied in the form of ordinary steel wool. The magnesium should be coarse turnings to avoid excessive reactivity. In the footing, thiosulfate sulfur initially separates as pale yellow elemental sulfur. Over the course of a day or so, this sulfur oxidizes to sulfate to that the final barren solution from the process is pale green copperas (ferrous sulfate).

Another method of scavenging the solution is by partial reduction of the pH with sulfuric acid to a pH range of 8–9 and subsequent footing with zinc dust at ambient temperature. The precious metals are then dropped as a powder.

The final waste chloride solution from the first hydrochloric acid alternative is either evaporated, to segregate chlorides and sulfates for disposal, or precipitated with barium hydroxide. The barium hydroxide treatment yields insoluble barium chloride which can be filtered and electrolysed. The electrolysis regenerates the barium hydroxide and hydrochloric acid by the trapping of anode chlorine gas in the water solution.

The second method allows for the partial recovery and recycle of the spent solutions to the process, which is both economical and environmentally sound.

Figure 6:
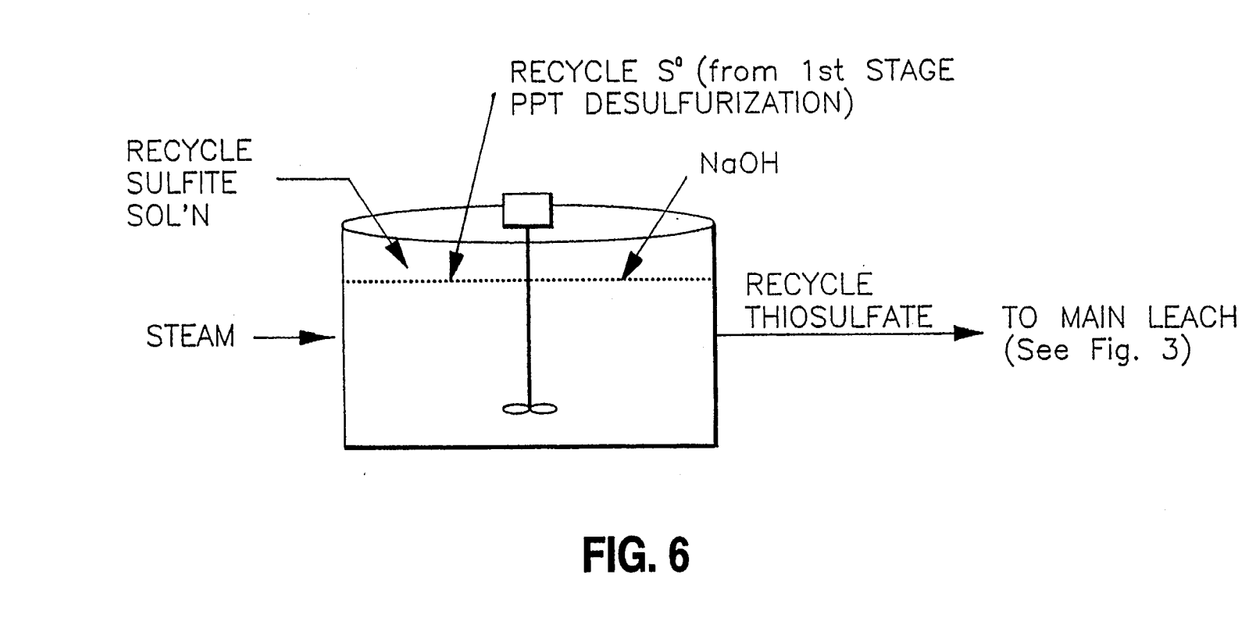
FIG. 6 is a schematic view of another aspect of this invention whereby the recycled sulfur plus sulfite solution is combined with sodium hydroxide to produce fresh thiosulfate solution for the primary leach stage.

RECYCLE THIOSULFATE RESYNTHESIS (FIG. 6)

The sodium sulfite from recycle is put into contact with the elemental sulfur from the desulfurization. Sodium hydroxide is added to resynthesise the sodium thiosulfate for the primary leach. As described, in relation to FIG. 1, steam is added to raise the temperature to 105° C. A boiling point rise due to the addition of the caustic allows for the elevation of the boiling point to about 105°–111° C.

EXAMPLE 1

The following test run of the process illustrates the integration of the leaching and first stage precipitation with the high-carbon high temperature firing of this invention. The Cu-Zn firing process was utilized to recover the gold from the first stage lead-bearing PM-PGE precipitate which is an option in this process. The nitric acid-steel wool parting techniques were used, then, to treat the button turnings from the firing and to recover the gold.

Sample: One kilogram of reddish ochre colored lakebed sediments finely ground and thoroughly mixed with 25 grams of slaked lime.

Leach Solution

As the dry mix, 200 grams of $NaSO_3$ (sodium sulfite), 200 grams of NaOH (sodium hydroxide) prills and 40 grams of yellow flour-fine Wilbur-Ellis (Trade-mark) spray sulfur were mixed with a few grams of the lakebed sediments. This mixture was dry-aged for 20 minutes at which point the caustic prills had colored to yellow or orange.

Some 25 mls of previous run pregs were added to 1 liter of boiling distilled water in a pyrex container. The aged dry mixture a was added to this solution and, with the elevated boiling point, the temperature of the solution maintained at 105°–111° C. After 20 minutes the leach solution was a pale straw color indicating the optimum state for the leaching.

The Leach

The dry sample was added to 1 liter of distilled water heated to 90° C. The liter of the thiosulfate leaching solution at 105° C. was added to this solution and the leach continued for 20 minutes at 90° C.

The solution was then filtered hot with vacuum aspiration through #1 paper. Two displacement washes of 1 liter of very hot distilled water were added to obtain a total of about 3 liters of diluted pregs. The pregs solution was a tawny coffee color. The pregnant solution was allowed to cool for some 15 minutes to a temperature of 50° C.

Precipitation

Heated glacial acetic acid was added (without water) to 70 grams of assay grade litharge (PbO) until the solution was clear. With stirring, the hot concentrated lead acetate (PbAc) solution was added to 3 liters of the PM-PGE pregnant solution at 50° C., and the mixture allowed to settle After a short time, the lead precipitate was filtered out. Most of the precipitate was black in color although some of the material was white. Lead thiosulfate is an insoluble white compound.

The total weight of the precipitate (air dried) was about 240 grams. The bulk of the precipitate was stored in plastic bags at 25° C.

Copper-Zinc Firing

The sample was 30 grams of the leach precipitate. The flux was a mixture of 30 grams of assay-grade copper powder, 15 grams of sodium cyanide (NaCN), 6 grams of calcium florite (CaF 2), 6 grams of borax, 60 grams of broken bottle glass, 80 grams of soda ash ($NaCO_3$) and 20 grams of carbon in the form of coconut charcoal dust ($-50$ mesh).

Some 15 grams of assay-grade zinc powder were added to an assay crucible and the flux and sample charge added to the top.

The mixture was fired up to 1500° C. for a total of 40 minutes in a direct fired diesel furnace. The firing poured a button of some 35–40 grams. Eight firings for the whole precipitate yielded eight buttons.

Parting

The Cu-Zn-Pb bullion button was drilled to fined turnings, and dissolved in dilute nitric acid. The acid was $\frac{1}{8}HNO_3$–$H_{20}$ and added at 50 mls per gram of button. After a maximum time of 1.5 hours, the blue-green parting solution had dissolved all but some small black granules of iridium residue. The acid was not quite run down and the pH was at 1.

The insoluble black residue was tested for iridium content. It was dissolved in fuming perchloric acid ($HClO_4$) and this produced a sky-blue iridium chloride solution. With the addition of excess saturated ammonium chloride solution ($NH_4Cl$) the solution turned canary yellow with the ammonium-iridium complex. When the reaction was reversed with concentrated caustic, the solution returned to the pale sky-blue color of iridium chloride.

The copper-rich parting solution was allowed to stand overnight at 25° C. The next morning there were some pale silver colored fines floating on the surface. Some 2–3 mls of concentrated hydrochloric acid was added to this solution and with wash the total was 500 mls of solution. To this was added, at 25° C., enough steel wool (about 10 grams added in two stages) to foot most of the metals in solution. There was a rationing of steel wool to separate gold (down first) from the PGEs.

There was rapid production of a coppery flocculent metallic "cement". The precipitate first plated on the wool and then turned flocculent as more iron dissolved. At the end of the process the solution turned green, with a coppery-colored cement on the bottom of the beaker and a floating brown scale precipitate at the liquid surface. The coppery metallic precipitate-cement and the surface skim were filtered, leaving a iron-green solution with slight bluish cast which was discarded although still containing PGEs.

Treatment Of Coppery Precipitate

Just enough $1/15$ $HNO_3$–$H_2O$ was added to the coppery sponge-brown precipitate to dissolve the copper from seven 1-gram partings. Some of the gold came to the surface as a tiny skin of scales which went to the wall of the beaker, and the rest of the gold remained down as a light-brown spongy residue. The copper appeared to have dissolved quite rapidly. The mixture was filtered through a small filter cone and the gold precipitate washed to the bottom of the cone. The cone was allowed to dry overnight.

Reduction Of Brown Precipitate

The top of the dried cone was removed and the bottom portion filled volume for volume, with sodium cyanide powder—about 2 grams of the NaCN. The paper was rolled tightly in a 3" square of 10 mil lead foil (about 8 grams of lead) and crimped tightly with pliers to help exclude air. The lead foil ball was cupelled for 20 minutes at 950° C. The result was a pale yellow (goldy) flower produced below the melting point of gold. The flower was carefully melted with acetylene torch in clean bone to produce a yellow-gold liquid button of weight of 0.3225 grams. The button was analyzed at 98% gold by standard independent analysis (SEM/XRF).

Thus it is apparent that there has been provided in accordance with the invention a process for the recovery of gold, silver (PMs) and the six platinum group elements (PGEs) from evaporite sediments that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A process for the recovery of gold, silver (PMs) and the six(6) platinum group elements (PGEs) from evaporite sediments comprising the following steps:
   (a) leaching fine sediments with sodium thiosulfate solution, at a temperature of at least 50° C. and a pH of at least 10.5, to produce a PM-PGE pregnant solution;
   (b) subjecting the metal-pregnant solution to selective precipitation to produce a precipitate, from which (principally) PM values may be recovered and a residual liquor, from which PGE values may be recovered.

2. A process according to claim 1 for the recovery of PMs and PGEs from evaporite sediments comprising the following steps:
   (a) leaching fine sediments with sodium thiosulfate solution, at a temperature of at least 50° C. and a pH of at least 10.5, to produce a PM-PGE pregnant solution;
   (b) subjecting the metal-pregnant solution to selective precipitation to produce a (principally) PM precipitate, and a residual liquor containing PGE values;
   (c) drying the (principally) PM precipitate and firing it with a copper-zinc high-carbon flux to produce a lead-copper-zinc (principally) PM metallic bullion;
   (d) treating the (principally) PM bullion sequentially with nitric acid, (±hydrochloric acid) and iron metal to produce a (principally) copper-gold precipitate;
   (e) treating the copper-gold precipitate with nitric acid to redissolve the process copper, and recovering the gold either by filtration and firing or by cupelling the gold precipitate.

3. A process according to claim 1 for the recovery of PMs and PGEs from evaporite sediments comprising the following steps:
   (a) leaching fine sediments with sodium thiosulfate solution, at a temperature of at least 50° C. and a pH of at least 10.5, to produce a PM-PGE pregnant solution;
   (b) subjecting the metal-pregnant solution to selective precipitation to produce a (principally) PM precipitate, and a residual liquor containing PGE values;
   (c) desulfurizing the (principally) PM precipitate to produce native sulphur and a (principally) PM solution;
   (d) treating the (principally) PM solution with zinc to produce a lead-PM sponge;
   (e) partially de-leading the metal sponge by resolution in nitric acid and, then, subjecting it to high-temperature, high-carbon copper-zinc firing to yield PM ore;
   (f) recovering the PM from the ore by acid parting.

4. A process according to claim 1 in which dry slacked lime is thoroughly mixed with the fine sediments, in a weight ratio of 1-3% prior to leaching.

5. A process according to claim 1 wherein the highly caustic sodium thiosulfate solution is an aqueous composition of sodium thiosulfate ($Na_2S_2O_3$), sodium polysulfide ($NaS^xH$), sodium hydroxide (NaOH) and sodium sulfite ($NaSO_3$).

6. A process according to claim 1 wherein the highly-caustic sodium thiosulfate solution is produced by a first stage of aging finely divided dry sulphur in a dry mixture of sodium sulfite and sodium hydroxide, and a second aqueous stage in which the aged mixture is dissolved in water.

7. A process according to claim 6 wherein the dry aging is catalyzed by the addition of evaporite sediments and the aqueous stage is catalyzed by the addition of pregnant solution resulting from a previous primary highly caustic sodium thiosulfate leach of the sediments.

8. A process according to claim 6 wherein the dry aging is carried out for a maximum of 20 minutes and the aqueous stage mixing is conducted at a temperature of 105°-111° C.

9. A process according to claim 6 wherein the dry sulphur, sodium hydroxide and sodium sulfite, is 10-15%, by weight of the dry sediments, the concentrated leach solution strength is 20-30% solids per liter of solution, and 1 liter of leach solution added per kilogram of dry solids.

10. A process according to claim 1 in which the residual liquor, from the precipitation of the pregnant solution, is scavenged with a metal reagent in acid solution to foot a PGE metallic powder.

11. A process according to claim 1 in which the hot caustic leach is carried out at a temperature of 50°-70° C. at a pH of not less than 10.5.

12. A process according to claim 1 in which the leach time does not exceed 20 minutes.

13. A process according to claim 1 in which the first stage precipitate is produced by treatment of the hot PM-PGE solution with lead acetate solution.

14. A process according to claim 1 in which the precipitation is carried out at a temperature of 50°-80° C.

15. A process according to claim 2 in which the lead-bearing PM-PGE precipitate is fired with zinc and copper at 1500° C.

16. A process according to claim 2 in which the copper-zinc flux also contains carbon and sodium cyanide and the weight ratios of precipitate to zinc, copper, carbon and sodium cyanide are 1:½:1:⅜:½ respectively.

17. A process according to claim 2 in which the initial parting with nitric acid of step (d) is with nitric acid of ⅓ strength with water at a pH of 1 for a maximum of 1.5 hours.

18. A process according to claim 3 in which the desulfurization of the lead-bearing PM precipitate is effected by the addition of cool, 50% nitric acid, to separate native sulfur.

19. A process according to claim 3 in which the zinc footing is carried out at a pH no higher than 5 and for no longer than 20 minutes.

20. A process according to claim 3 in which the high temperature firing is conducted at 1500° C. with a flux containing copper, zinc, sodium cyanide and elemental carbon.

21. A process according to claim 20 in which the weight ratios of precipitate to zinc, copper, carbon and sodium cyanide are approximately 1:½:1:⅜:½ respectively.

22. A process according to claim 3 in which the final acid parting of step (f) is the sequential treatment with nitric acid, (±hydrochloric acid), iron and, then, nitric acid to yield a gold residue that can be recovered by either low temperature firing or cupellation.

23. A process according to claim 10 in which the residual liquor containing PGEs is acidified with hydrochloric acid and treated with metallic iron, or metallic magnesium, to foot, eventually, the PGEs in elemental form.

24. A process according to claim 1 in which the pH of the residual liquor containing the PGE is reduced with sulfuric acid to the range of 8–9 and the PGE precipitated as a metallic powder by the addition of zinc.

25. In the assay and recovery of PMs in the presence of relatively high amounts of PGEs in mineral deposits and in intermediate recovery material, a process comprising the following step:
 (a) firing either the mineral deposit fines or the process intermediates at a temperature of at least 1500° C. with a flux containing elemental carbon, to produce a metallic bullion containing substantially all of the PM-PGE values.

26. A process according to claim 25 in which the firing is conducted in a partially open crucible to allow the evolution of lead (Pb°) vapor.

* * * * *